United States Patent [19]

Stöcker et al.

[11] Patent Number: 4,761,165
[45] Date of Patent: Aug. 2, 1988

[54] PRESSURE SWING ADSORPTION CONTROL METHOD AND APPARATUS

[75] Inventors: Jörg Stöcker, St. Stevens-Woluwe; Michael Whysall, Wilrijk, both of Belgium

[73] Assignee: Union Carbide Corporation, Danbury, Conn.

[21] Appl. No.: 91,889

[22] Filed: Sep. 1, 1987

[51] Int. Cl.[4] ............................................. B01D 53/04
[52] U.S. Cl. .................................................. 55/21; 55/26; 55/163; 55/179
[58] Field of Search ................... 55/21, 26, 74, 163, 55/179

[56] References Cited

U.S. PATENT DOCUMENTS

| | | | |
|---|---|---|---|
| 3,176,444 | 4/1965 | Kiyonaga | 55/26 |
| 3,703,068 | 11/1972 | Wagner | 55/21 |
| 4,070,164 | 1/1978 | Miwa et al. | 55/26 |
| 4,234,322 | 11/1980 | De Meyer et al. | 55/21 X |
| 4,299,595 | 11/1981 | Benkmann et al. | 55/21 |
| 4,360,362 | 11/1982 | Asztalos | 55/21 |
| 4,475,930 | 10/1984 | Asztalos | 55/26 |
| 4,693,730 | 9/1987 | Miller et al. | 55/26 X |

Primary Examiner—Kathleen J. Prunner
Attorney, Agent, or Firm—Morris N. Reinisch

[57] ABSTRACT

The present invention provides a method and apparatus for automatically controlling product repressurization in a pressure swing adsorption (PSA) process. According to the invention the same valve employed for withdrawing product from a bed during adsorption is employed to feed product gas to that bed during product repressurization. This enables the elimination of several valves, including a system-dependent valve, thereby improving system reliability. The same controllable valve may also be used to control the pressure in the PSA system.

22 Claims, 4 Drawing Sheets

FIG. 4

| STEP | 1 | 2 | 3 | 4 | 5 | 6 | 7 | 8 | 9 | 10 | 11 | 12 |
|---|---|---|---|---|---|---|---|---|---|---|---|---|
| VESSEL | | | | | | | | | | | | |
| A | ▽ ADSORPTION ▽ | | | ◁ EQ H | ▽ EQ | ◁ PROVIDE PURGE | BLOW DOWN ▽ | | ▽ PURGE ▽ | ▽ EQ | ◁ EQ H | ▽ PRODUCT REPRESSUR- IZATION |
| B | BLOW DOWN ▽ | | ▽ PURGE ▽ | | | ◁ PRODUCT REPRESSUR- IZATION | | | ◁ ADSORPTION ◁ | | | ◁ PROVIDE PURGE |
| C | ◁ EQ H | ▽ EQ | ◁ PROVIDE PURGE | BLOW DOWN ▽ | | ▽ PURGE ▽ | | ▽ PRODUCT REPRESSUR- IZATION | | ◁ ADSORPTION ◁ | | |
| D | ▽ EQ | ◁ PRODUCT REPRESSUR- IZATION | | ◁ ADSORPTION ◁ | | | ▽ EQ | ◁ EQ H | ◁ PROVIDE PURGE | BLOW DOWN ▽ | | ▽ PURGE ▽ |

TIME 0    225    450    675    900
(SECONDS)

EQ = PRESSURE EQUALIZATION
H = HOLD*

△ = COCURRENT FLOW
▽ = COUNTERCURRENT FLOW

*HOLD IS INITIALLY SET FOR 0 SECONDS

PRESSURE SWING ADSORPTION CONTROL METHOD AND APPARATUS

BACKGROUND TO THE INVENTION

The present invention relates to control of a pressure swing adsorption system; and, more particularly, to a method and apparatus for controlling product repressurization in a multi-bed system to improve system reliability.

Pressure swing adsorption (PSA) provides an efficient and economical means for separating a multicomponent gas stream containing at least two gases having different adsorption characteristics. The more-strongly adsorbable gas can be an impurity which is removed from the less-strongly adsorbable gas which is taken off as product; or, the more-strongly adsorbable gas can be the desired product, which is separated from the less-strongly adsorbable gas. For example, it may be desired to remove carbon monoxide and light hydrocarbons from a hydrogen-containing feed stream to produce a purified (99+%) hydrogen stream for a hydrocracking or other catalytic process where these impurities could adversely affect the catalyst or the reaction. On the other hand, it may be desired to recover more-strongly adsorbable gases, such as ethylene, from a feed to produce an ethylene-rich product.

In pressure swing adsorption, a multicomponent gas is typically fed to at least one of a plurality of adsorption beds at an elevated pressure effective to adsorb at least one component, while at least one other component passes through. At a defined time, feed to the adsorber is terminated and the bed is depressurized by one or more cocurrent depressurization steps wherein pressure is reduced to a defined level which permits the separated, less-strongly adsorbed component or components remaining in the bed to be drawn off without significant concentration of the more-strongly adsorbed components. Then, the bed is depressurized by a countercurrent depressurization step wherein the pressure on the bed is further reduced by withdrawing desorbed gas countercurrently to the direction of feed. Finally, the bed is purged and repressurized. The final stage of repressurization is with product gas and is often referred to as product repressurization.

In multi-bed systems there are typically additional steps, and those noted above may be done in stages. U.S. Pat. Nos. 3,176,444 to Kiyonaga, 3,986,849 to Fuderer et al, and 3,430,418 and 3,703,068 to Wagner, among others, describe multi-bed, adiabatic pressure swing adsorption systems employing both cocurrent and countercurrent depressurization, and the disclosures of these patents are incorporated by reference in their entireties.

Every adsorber in a multi-bed system (PSA unit) is equipped with a plurality of valves operated by a cycle controller. In addition to feed, product, and waste gas valves, other valves are typically employed to enable pressure equalizations between adsorbers. Pressure swing adsorption in multi-bed systems remains essentially a batch process, simply cycling a number of beds through a coordinated series of steps, and a number of valves are idle at any given time.

Typically, there are valves in a PSA unit which, if they fail, can cause shutdown of the entire unit. In U.S. Pat. No. 4,234,322, De Meyer et al describe a PSA unit having at least eight phase staggered operated beds which permits continued operation even where one bed must be removed due to valve failure. However, one valve (namely, 101) is employed in product repressurization of all of the nine beds shown in FIG. 1. Thus, should this valve fail, the whole unit would have to be shut down.

There is a present need for a scheme which would permit rearranging flow in a pressure swing adsorption system to eliminate one or more valves, especially where this is consistent with the need to maintain a substantially constant flow of product from the system. Moreover, it would be especially desirable to have an improved system which eliminated system-dependent valves, which, if they failed, could cause shutdown of all beds of a multi-bed system.

SUMMARY OF THE INVENTION

The present invention provides such in a new method and apparatus for controlling product repressurization in a pressure swing adsorption system.

The process comprises: during product repressurization of a vessel, supplying product gas through a controllable valve at the outlet end of the vessel, the controllable valve being the same valve as employed to release product gas from the vessel during the adsorption step.

The apparatus comprises: a conduit connecting the outlet end of a pressure swing adsorption vessel to a product header for a multi-bed system; a positionable valve in the conduit; and means for generating a control signal to open the valve to permit flow from the product header during product repressurization and to permit flow of product from the vessel to the product header during adsorption.

Both the method and apparatus provide significant advantages by eliminating at least one system-dependent valve and thereby improving reliability of operation. Moreover, other advantages flow from implementing the invention in specific multi-bed configurations. For example, it is possible to eliminate a set of valves typically provided for first pressure equalization, and to then perform the first equalization through either: (i) available, idle valves provided for another equalization, or (ii) through available valves for another equalization which normally takes place simultaneously, by performing two equalizations sequentially but within the time period normally employed for only one.

BRIEF DESCRIPTION OF THE DRAWINGS

The invention will be better understood and its advantages will become more apparent when the following detailed description is read with reference to the accompanying drawings wherein:

FIG. 4 is a chart showing a representative sequencing of a four-bed PSA system through a complete cycle of operation.

DETAILED DESCRIPTION

Figure 1:
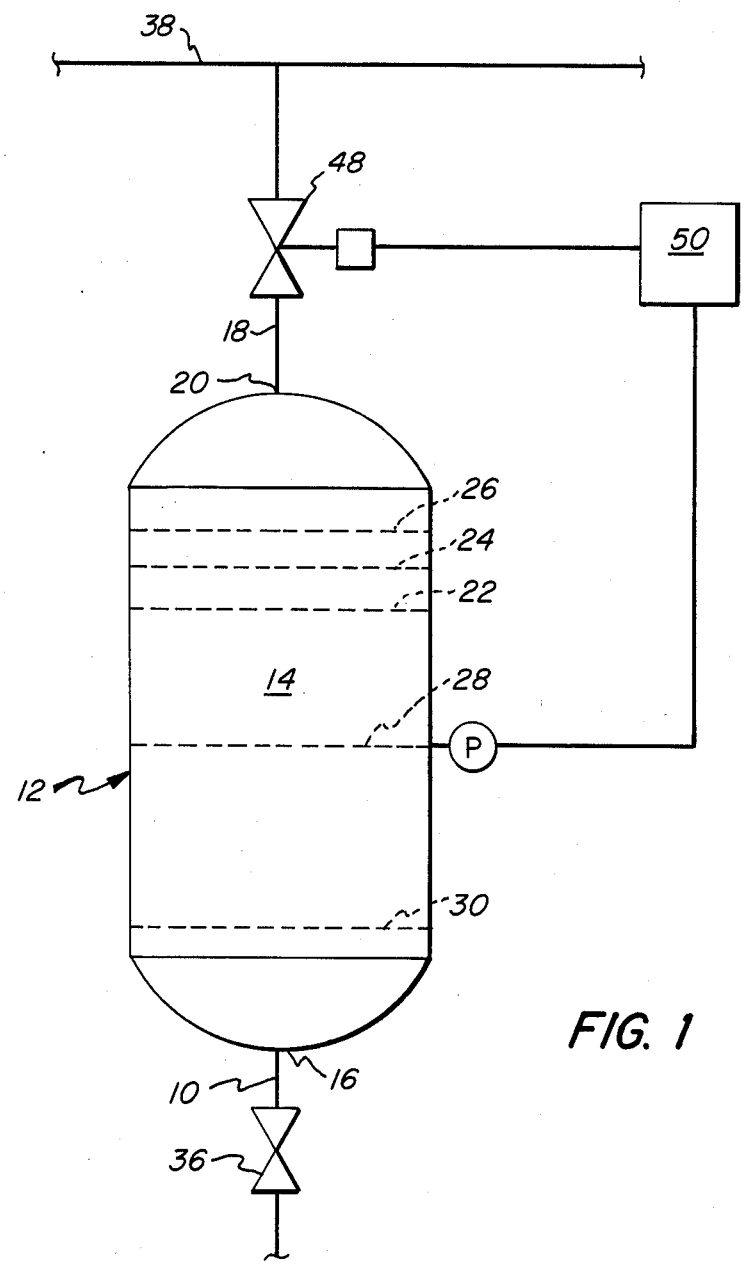
FIG. 1 is a schematic of a single adsorption bed showing representative adsorbed gas loading at various stages of a single cycle of operation.

The pressure swing adsorption process is an essentially adiabatic process for separating a multicomponent fluid containing at least one selectively-adsorbable component. FIG. 1 shows feed fluid stream 10 comprising an admixture of impurity and product fluids, entering adsorption zone 12 containing a bed 14 of adsorbent material capable of selectively adsorbing the impurity from the feed fluid stream.

The term "impurity" denotes the component or components which are more-strongly adsorbed in the process. Thus, the material described as impurity is not limited to a common definition of the term which denotes something unwanted and to be discarded. The term "product" denotes the less-strongly adsorbed fluid in the feed fluid stream and does not necessarily mean that this component is the desired component to which the process is directed.

The bed, because of the packing of the adsorbent material, contains non-selective voids. The feed fluid stream is introduced and contacted with the bed at an inlet end 16 of the adsorption zone at a first elevated pressure, thereby adsorbing the impurity in the adsorbent material and trapping part of the product fluid in the voids. An impurity-depleted product fluid 18 is discharged from the opposite end 20 of the adsorption zone.

As feed to the bed progresses, an impurity adsorption front is established at the inlet end of the adsorption zone and progressively moves longitudinally through the adsorption zone toward the discharge end to a predetermined level 22 wiihin the zone. The introduction of the feed fluid is then terminated.

The product fluid trapped in the voids is then removed through the discharge end 20 of the adsorption zone by cocurrently depressurizing the adsorption zone from the first elevated pressure to a lower but still elevated pressure. This cocurrent depressurization causes the impurity adsorption front to advance toward the discharge end of the bed to a new level 26. Preferably, one or more intermediate steps of pressure equalization are comprised in cocurrent depressurization to bring the front to level 24, with the final stage of cocurrent depressurization advancing the front to level 26. In multi-bed systems the cocurrent depressurization stage also provides purge gas to a bed undergoing regeneration. Thus, this step can be termed a provide purge step and is so referred to in FIG. 4.

Following cocurrent depressurization, the adsorption zone is desorbed countercurrently to the direction of feed by further decreasing the pressure in the bed and withdrawing desorbed gas at 16. This step brings the front to level 28. The bed is purged with cocurrent depressurization effluent from another bed, or purged with pure product, to bring the front to level 30.

Prior to employing the vessel for another adsorption step, it must be repressurized to avoid damage to the bed. Repressurization is typically conducted in two principal stages. In the first, void space gas from a vessel undergoing cocurrent depressurization is supplied until the pressure in the two vessels is equalized. This is termed pressure equalization and can be accomplished in several steps with void space gas from several vessels supplied at sequencially increasing pressures. In the final equalization, product gas may also be supplied. In the second stage, product repressurization, product gas alone is supplied to the vessel. According to the invention, product gas is supplied to the vessel 14 through the same valve, namely controllable valve 48, employed to withdraw product gas during the adsorption step. Valve 48 is preferably a continuously positionable valve which is controlled by controller 50 to achieve the rate of flow desired at any given time.

It is preferred in most PSA units to provide a constant flow of product gas from the system. This requires that the flow of product gas from header 38 through valve 48 (or other valve associated with another vessel undergoing product repressurization) be maintained at a constant rate. This can be accomplished in a number of ways. For example, as shown in FIG. 1, controller 50 can receive a signal from a pressure sensor P and control valve 48 in response thereto. By sensing the pressure in the vessel 14 undergoing product repressurization, and determining the difference between the sensed value and the end pressure of product repressurization, the flow can be effectively controlled.

Alternatively, the flow of product from the system can be measured and the flow of product gas through valve 48 to vessel 14 controlled in response thereto to maintain the flow of product gas from the system at a substantially constant rate.

Figure 2:
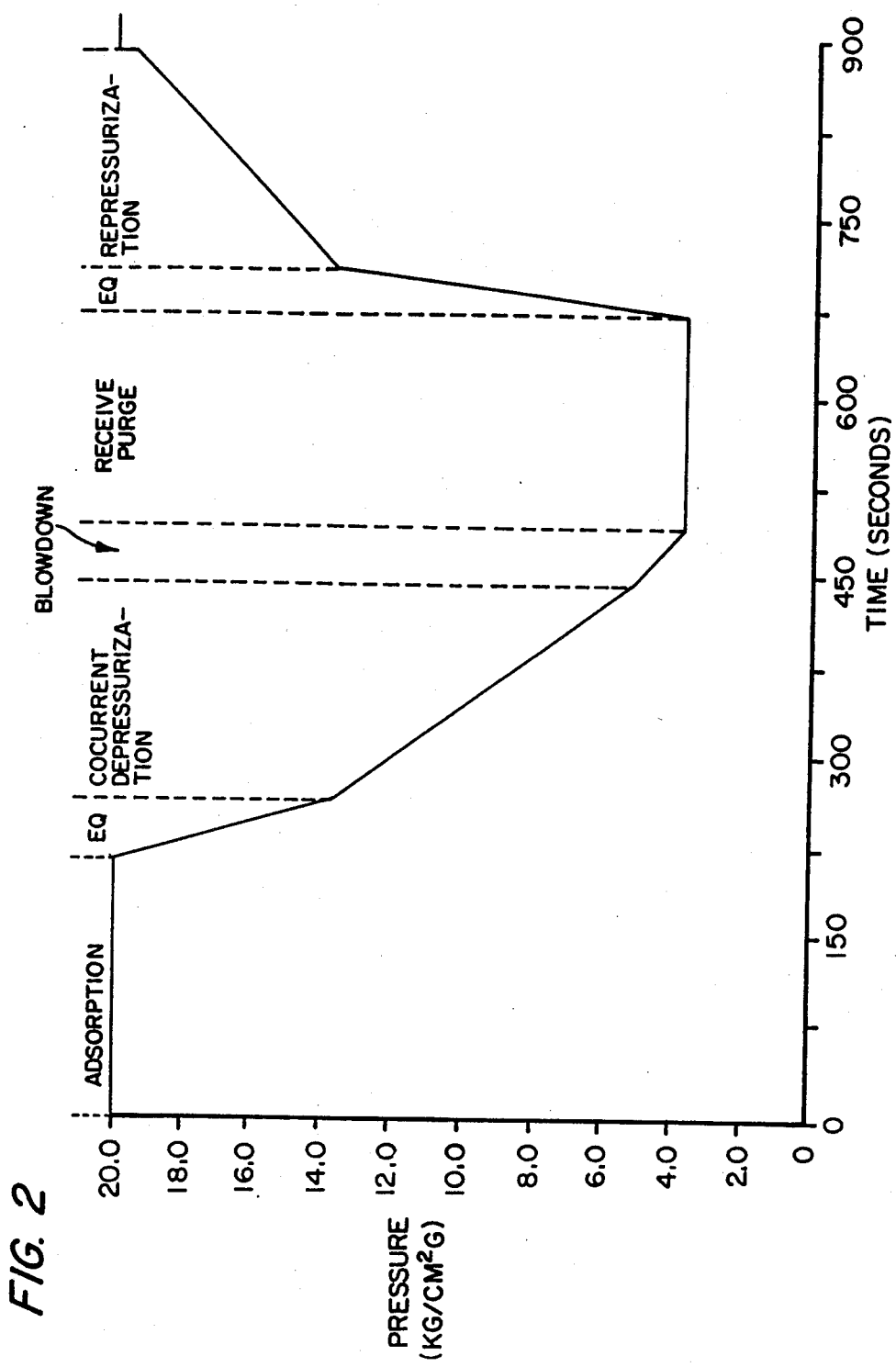
FIG. 2 is a graph showing a pressure profile of a single adsorption bed for a single cycle of operation.

Representative stage times for a single bed and associated pressures for each stage are shown in FIG. 2.

Both the method and apparatus provide significant advantages by eliminating at least one system-dependent valve and thereby improving reliability of operation. Moreover, other advantages flow from implementing the invention in specific multi-bed configurations. For example, it is possible to eliminate a set of valves typically provided for first pressure equalization, and to then perform the first equalization through either: (i) available, idle valves provided for another equalization, or (ii) through available valves for another equalization which normally takes place simultaneously, by performing two equalizations sequentially but within the time period normally employed for only one.

A further advantage is that product pressure, e.g., the pressure of the final product stream from the system, can be effectively controlled. For example, because the system product pressure is dependent on the pressure of product flowing from any bed undergoing adsorption and the pressure of any product being utilized for product repressurization, it is possible by controlling the rate of flow to the vessel undergoing product repressurization, to control system product pressure.

EXAMPLE

Figure 3:
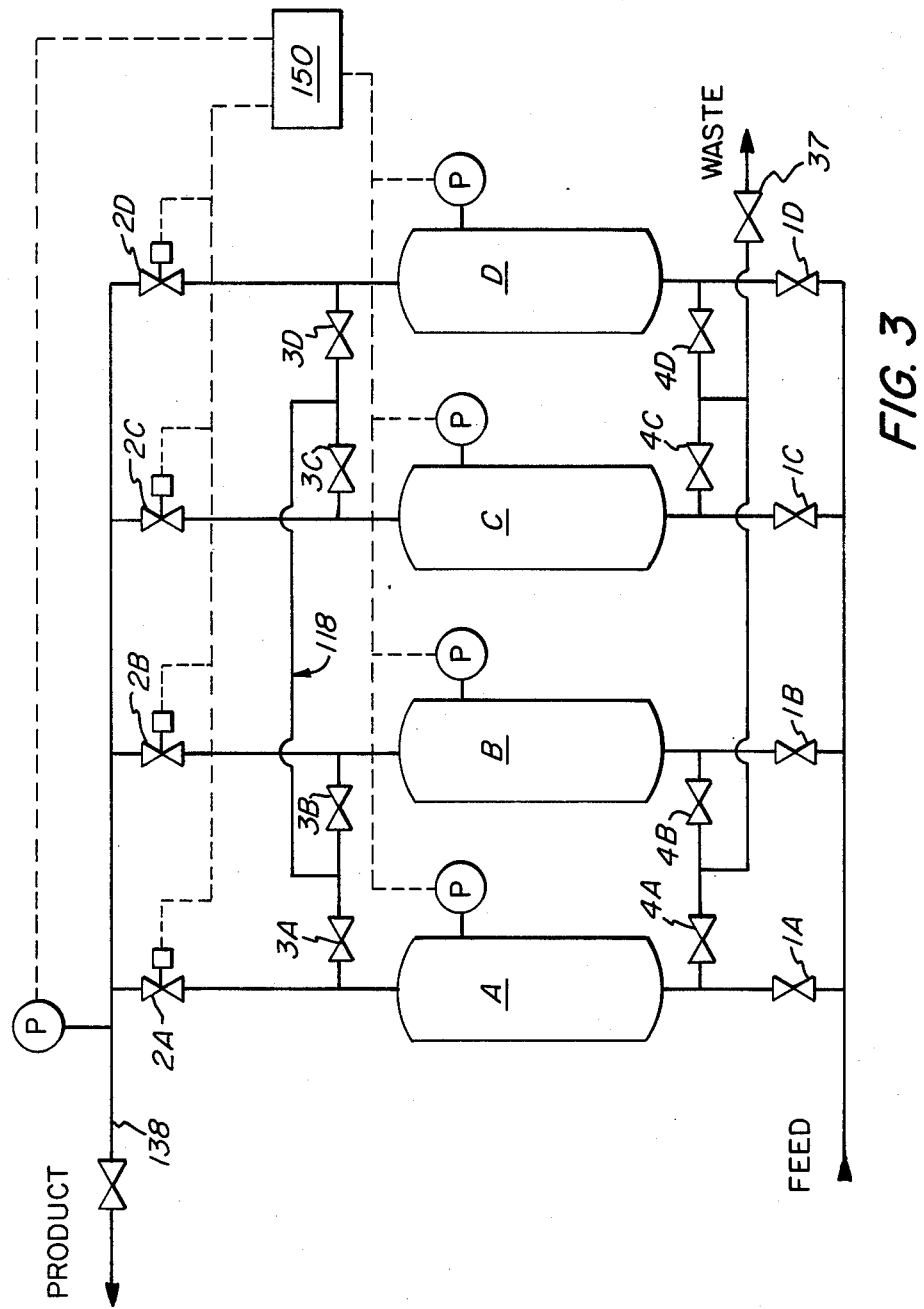
FIG. 3 is a schematic showing a four-bed PSA system.

This Example describes the operation of a four-bed pressure adsorption system as shown in FIG. 3 for purification of a hydrogen-rich gas stream from a steam reformer (typically, on a molar basis, 75% hydrogen, 4% methane, 3% carbon monoxide, 0.5% nitrogen, with the balance being carbon dioxide, and being saturated with water) to produce 99+ mole percent hydrogen, with minimal, e.g., less than 10 parts per million, concentration of carbon monoxide. The invention is, however, applicable to other multi-bed systems and can be employed also where the more-strongly adsorbed gas is the product gas.

Each of the four beds will have a lower layer of activated carbon and an upper layer of zeolite and undergoes each of the noted stages through a complete cycle.

This process can be performed with any suitable adsorbent, such as zeolitic molecular sieves, activated carbon, silica gel, activated alumina, and the like, as set forth in the above-referenced Kiyonaga patent, having a selectivity for the impurity over the product fluid.

FIG. 4 is a chart showing the direction of flow within each of the beds shown in FIG. 3 during each of the stages of the cycle and the sequencing of all of the beds through one complete cycle of adsorption and regeneration.

FIG. 4 is based on a 15-minute cycle time. Cycle time is defined as the time that is required for all four adsorbers to go through a complete cycle of adsorption and regeneration. FIG. 4 describes in detail the twelve time periods that each adsorber goes through during one complete cycle. A single process step may cover several time periods. The graph in FIG. 2 shows representative pressures versus time for each step in the cycle for a single adsorber. In the following description, unless the valves are indicated as being open, they are closed.

Time Period 1

(a) Simultaneously, valves 1A and 2A open to begin adsorption in adsorber A while valves 1C and 2C close to stop adsorption in adsorber C.

(b) Valves 3C and 3D open to begin equalization from adsorber C to adsorber D. During pressure equalization, adsorber C is depressurized cocurrently through valve 3C to an intermediate pressure. The gas released flows directly to adsorber D undergoing repressurization (see FIGS. 3 and 4) to provide gas for partial repressurization of that adsorber. Valve 2D is partially open to allow product gas produced from adsorber A to flow into adsorber D at a controlled rate. This rate will be controlled by controller 150 as a function of the pressure measured in vessel D by the pressure sensor P associated with it. The impurity front advances during this step, e.g., to a degree represented as level 24 in FIG. 1. During this repressurization stage, adsorber D is repressurized from two sources of hydrogen:

(1) Pressure equalization with gas from vessel C as described in (b) above; and
(2) Also with product gas according to the invention through a continuously positionable valve 2D.

(c) Valves 4B and 37 open to begin the countercurrent depressurization (blowdown) step of adsorber B. During blowdown, the adsorber is depressurized out of the bottom of the vessel (countercurrently) through valves 4B and 37 to waste stream pressure. Impurities are desorbed and vented, and the impurity front drops, say proportional to level 28 in FIG. 1.

Time Period 2

(a) Adsorber A continues adsorption.
(b) Adsorber B continues blowdown.
(c) Valve 3C closes, ending equalization between adsorbers C and D. Adsorber C remains in a hold condition through the rest of the step.
(d) Adsorber D continues product repressurization through valve 2D, the rate being controlled by adjustment of valve 2D in response to the pressure measured in vessel D. Preset conditions and sensed pressure in line 138 can also be employed to control valve 2D.

Time Period 3

(a) Adsorber A continues adsorption.
(b) Adsorber D continues product repressurization through valve 2D.
(c) Adsorber B is purged by the effluent from the last stage of cocurrent depressurization of adsorber C. Adsorber C provides essentially clean hydrogen gas through valves 3C and 3B. The clean hydrogen gas purges adsorber B and flows out, together with desorbed impurities, through valves 4B and 37. The purge stops when the termination pressure for cocurrent depressurization is reached. See FIG. 2 for example. During this stage the impurity front advances towards the top of the depressurizing adsorber (e.g., level 26 in FIG. 1).

Time Period 4

(a) Simultaneously, valves 1D and 2D open to begin adsorption in adsorber D while valves 1A and 2A close to stop adsorption in adsorber A.

(b) Valves 3A and 3B open to begin equalization from adsorber A to adsorber B.

(c) Part of the product flow is diverted from product header 138 through valve 2B for product repressurization of adsorber B.

(d) Valves 4C and 37 open to begin blowdown of adsorber C.

Time Period 5

(a) Adsorber D continues adsorption.
(b) Adsorber C continues blowdown.
(c) Valve 3A closes ending equalization between adsorbers A and B. Adsorber A remains in a hold condition through the rest of the step.
(d) Adsorber B continues product repressurization.

Time Period 6

(a) Adsorber D continues adsorption.
(b) Adsorber B continues product repressurization.
(c) Adsorber C is purged by the effluent from cocurrent depressurization of adsorber A. Adsorber A provides clean hydrogen gas through valves 3A and 3C. The clean hydrogen gas purges adsorber C and flows out through valves 4C and 37.
(d) Adsorber A provides purge gas until the pressure drops to the cocurrent termination pressure.

Time Period 7

(a) Simultaneously, valves 1B and 2B open to begin adsorption in adsorber B while valves 1D and 2D close to stop adsorption in adsorber D.

(b) Valves 3C and 3D open to begin equalization from adsorber D to adsorber C.

(c) Part of the product flow is diverted from product header 138 through valve 2C for product repressurization of adsorber C.

(d) Valves 4A and 37 open to begin the blowdown step of adsorber A.

Time Period 8

(a) Adsorber B continues adsorption.
(b) Adsorber A continues blowdown.
(c) Valve 3D closes ending equalization between adsorbers D and C. Adsorber D remains in a hold condition through the rest of the step.
(d) Adsorber C continues product repressurization.

Time Period 9

(a) Adsorber B continues adsorption.
(b) Adsorber C continues product depressurization.
(c) Adsorber A is purged by adsorber D. Adsorber D provides clean hydrogen gas through valves 3D and 3A. The clean hydrogen gas purges adsorber A and flows out through valves 4A and 37.
(d) Adsorber D provides purge gas until the pressure drops to the cocurrent termination pressure.

Time Period 10

(a) Simultaneously, valves 1C and 2C open to begin adsorption in adsorber C while valves 1B and 2B close to stop adsorption in adsorber B.

(b) Valves 3A and 3B open to begin equalization from adsorber B to adsorber A.

(c) Part of the product flow is diverted from product header 138 through valve 2A for product repressurization of adsorber A.

(d) Valves 4D and 37 open to begin the blowdown step of adsorber D.

Time Period 11

(a) Adsorber C continues adsorption.

(b) Adsorber D continues blowdown.

(c) Valve 3B closes ending equalization between adsorbers B and A. Adsorber B remains in a hold condition through the rest of the step.

(d) Adsorber A continues product repressurization.

Time Period 12

(a) Adsorber C continues adsorption.

(b) Adsorber A continues product pressurization.

(c) Adsorber D is purged by adsorber B. Adsorber B provides clean hydrogen gas through valves 3B and 3D. The clean hydrogen gas purges adsorber D and flows out through valves 4D and 37.

(d) Adsorber B provides purge gas until the pressure drops to the cocurrent termination pressure. At the end of time period 12, the system returns to time period 1 and the cycle is repeated.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

We claim:

1. A process for controlling product repressurization in a pressure swing adsorption vessel of a multi-bed pressure adsorption system, comprising:
   supplying product gas to said vessel for product repressurization through a controllable valve at the outlet end of said vessel, said valve being the same as also employed to release product gas from said vessel during an adsorption step; and
   controlling the rate of supply by adjusting said valve.

2. A process according to claim 1 wherein product flow from the system is maintained substantially constant by maintaining a constant flow of product to said vessel undergoing product repressurization.

3. A process according to claim 2 wherein constant flow to said vessel undergoing product repressurization is maintained by: sensing the pressure within said vessel undergoing product repressurization; and controlling the rate of product gas supplied to said vessel undergoing product repressurization through said controllable valve in response to said pressure.

4. A process according to claim 2 wherein constant flow to said vessel undergoing product repressurization is maintained by: sensing the flow of product gas from said system; and varying flow to said vessel undergoing product repressurization through said controllable valve in response to the sensed value.

5. A pressure swing adsorption process employing a plurality of pressure swing adsorption vessels, each containing an adsorbent and void space, comprising: supplying feed fluid to a feed end of a first pressure swing adsorption vessel at a first elevated pressure while withdrawing product gas through a continuously positionable valve from a discharge end of said first vessel; terminating supply of feed to said first vessel; withdrawing void space product from said first vessel and (i) for a first period, supplying said void space product to a second pressure swing adsorption vessel at an elevated pressure lower than that of said first vessel to equalize its pressure with said first vessel, and (ii) for a later period, supplying said void space product to a further pressure swing adsorption vessel at a still lower but elevated pressure to purge said later vessel of impurities; purging said first vessel of impurities; partially repressurizing said first vessel to a second elevated pressure; and product repressurizing said first vessel to said first elevated pressure by supplying product gas through said valve previously employed to withdraw product gas therefrom.

6. A process according to claim 5 wherein at least three adsorption vessels are operated as a system to obtain a constant flow of product gas from a common product gas header which receives product gas from each of the vessels.

7. A process according to claim 6 wherein said constant flow of product gas is controlled, during product repressurization of said first vessel, by: sensing the pressure within said first vessel undergoing product repressurization, and controlling the feed of product gas to said first vessel through said continuously positionable valve at a substantially constant rate in response to sensed pressure.

8. A process according to claim 6 wherein said constant flow of product gas is controlled, during product repressurization of said first vessel, by: sensing the flow of product gas from said system; and varying flow to said first vessel during product repressurization through said continuously positionable valve in response to the sensed value.

9. A process according to claim 5 which further includes at least one subsequent pressure equalization step following said first period.

10. In an adiabatic pressure swing adsorption process for separating a gas mixture by adsorbing at least one gas component in each of a plurality of adsorbent beds, wherein each of the adsorbent beds is cyclically operated in subsequent operation steps including adsorption; at least two depressurization steps; countercurrent purging; and at least two repressurization steps, at least the final one being product repressurization; the improvement comprising: during product repressurization of a vessel, supplying product gas through a controllable valve at the outlet end of the vessel, the controllable valve being the same valve as employed to release product gas from the vessel during the adsorption step.

11. An apparatus for controlling product repressurization of a designated pressure swing adsorption vessel of a multi-bed pressure adsorption system of the type wherein each vessel encloses a bed comprising adsorbent and void space and has a feed end in communication with a feed header and an outlet end in communication with a system product header, and wherein each bed is cycled through the steps of adsorption; cocurrent depressurization, during which void space product gas vide purge, wherein void space product gas is fed to another bed undergoing purge; countercurrent depressurization; purge; and repressurization, which includes pressure equalization with void space product received from a bed undergoing cocurrent depressurization and final product pressurization; said apparatus comprising:

a conduit connecting said outlet end of said designated vessel to said product header;

a controllable valve in said conduit; and means for controlling said valve to permit flow to said designated vessel during product repressurization and to permit flow therefrom during adsorption.

12. An apparatus according to claim 11, further comprising means for maintaining substantially constant product flow from said system.

13. An apparatus according to claim 12 including means for maintaining constant flow of product to a vessel undergoing product repressurization.

14. An apparatus according to claim 13 wherein said means for maintaining constant flow of product to a vessel undergoing product repressurization comprise: means for sensing the pressure within said vessel undergoing product repressurization; and means for controlling said controllable valve in response to said means for sensing said pressure.

15. An apparatus according to claim 13 wherein said means for maintaining constant flow of product to a vessel undergoing product repressurization comprise: means for sensing the flow of product gas from said system; and means for controlling said controllable valve in response to said means for sensing said flow.

16. An apparatus according to claim 13 wherein said controllable valve is a continuously positionable valve.

17. An apparatus according to claim 11 which further includes means for controlling the cocurrent depressurization of each vessel to provide a first pressure equalization directly followed by a second pressure equalization, both preceding providing purge for a bed undergoing purge.

18. An apparatus for controlling product repressurization in a pressure swing adsorption vessel of a multibed pressure adsorption system, said vessel having an inlet end and an outlet end, said apparatus comprising:

a conduit connecting said outlet end of said vessel to a product header for said system;

a continuously positionable valve in said conduit; and means for generating a control signal to open said valve to permit flow from said product header during product repressurization and to permit flow of product from said vessel to said product header during adsorption.

19. An apparatus according to claim 18 which further includes: means for sensing the pressure within said vessel undergoing product repressurization; and means for controlling said continuously positionable valve in response to said means for sensing said pressure.

20. An apparatus according to claim 18 which further includes: means for sensing the flow of product gas from said system; and means for controlling said continuously positionable valve in response to said means for sensing said flow.

21. An apparatus for controlling product repressurization in a pressure swing adsorption vessel of a multibed pressure adsorption system, said vessel having an inlet end and an outlet end, said apparatus comprising:

a conduit connecting said outlet end of said vessel to a product header for said system;

a continuously positionable valve in said conduit;

means for generating a control signal to open said valve to permit flow from said product header during product repressurization and to permit flow of product from said vessel to said product header during adsorption;

means for sensing the pressure within said vessel undergoing product repressurization; and means for controlling said continuously positionable valve in response to said means for sensing said pressure.

22. An apparatus for controlling product repressurization in a pressure swing adsorption vessel of a multibed pressure adsorption system, said vessel having an inlet end and an outlet end, said apparatus comprising:

a conduit connecting said outlet end of said vessel to a product header for said system;

a continuously positionable valve in said conduit;

means for generating a control signal to open said valve to permit flow from said product header during product repressurization and to permit flow of product from said vessel to said product header during adsorption;

means for sensing the flow of product gas from said system; and means for controlling said continuously positionable valve in response to said means for sensing said flow.

* * * * *